United States Patent [19]

De Groot et al.

[11] Patent Number: 4,895,109
[45] Date of Patent: Jan. 23, 1990

[54] MASH-FEED TROUGH

[76] Inventors: Cornelis J. De Groot; Adrianus W. J. De Groot, both of 11, NL-6613 AG, Balgoij, Netherlands

[21] Appl. No.: 218,285
[22] PCT Filed: Oct. 13, 1987
[86] PCT No.: PCT/NL87/00027
 § 371 Date: Jun. 13, 1988
 § 102(e) Date: Jun. 13, 1988
[87] PCT Pub. No.: WO88/02597
 PCT Pub. Date: Apr. 21, 1988

[30] Foreign Application Priority Data

Oct. 13, 1986 [NL] Netherlands ............... 8602572

[51] Int. Cl.$^4$ ............................................. A01K 5/02
[52] U.S. Cl. .......................................... 119/51.5; 119/54
[58] Field of Search .................. 119/54, 56, 61, 51.5, 119/53.5

[56] References Cited

U.S. PATENT DOCUMENTS

| 3,001,410 | 9/1961 | Leason | 119/56 R |
|---|---|---|---|
| 3,033,164 | 5/1962 | Evers | 119/54 |
| 3,196,835 | 7/1965 | Bergevin | 119/51.5 |
| 3,536,046 | 10/1970 | Lippi | 119/51.5 |
| 3,782,332 | 1/1979 | Depenthal et al. | 119/51.5 |
| 3,920,224 | 11/1975 | Fassauer | 119/56 R |
| 4,134,365 | 1/1979 | Futers et al. | 119/51.5 |
| 4,235,200 | 11/1980 | Shay | 119/56 R |
| 4,256,054 | 3/1981 | Hitchcock | 119/51.5 |
| 4,315,484 | 2/1982 | Kingery | 119/54 |
| 4,377,130 | 3/1983 | Schwieger | 119/51.5 |
| 4,640,229 | 2/1987 | Swartzendruber | 119/51.5 |
| 4,688,520 | 8/1987 | Parks | 119/51.5 |
| 4,721,063 | 1/1988 | Atchley | 119/61 |

OTHER PUBLICATIONS

Stalko, en A. K. Gedeponeerle Merken van: Kouwenbergh, Komplete Stalinrichtingen, 1984.

Primary Examiner—Paul J. Hirsch
Attorney, Agent, or Firm—Watson, Cole, Grindle & Watson

[57] ABSTRACT

The mash feed through comprises a casing (2) of which the upper piece (12) encases a storage reservoir (11) and of which the bottom piece (49) accommodates a dish-shaped feed trough. The storage reservoir is closed off on its underside by a valve (18) provided to be actuated by an animal.

11 Claims, 4 Drawing Sheets

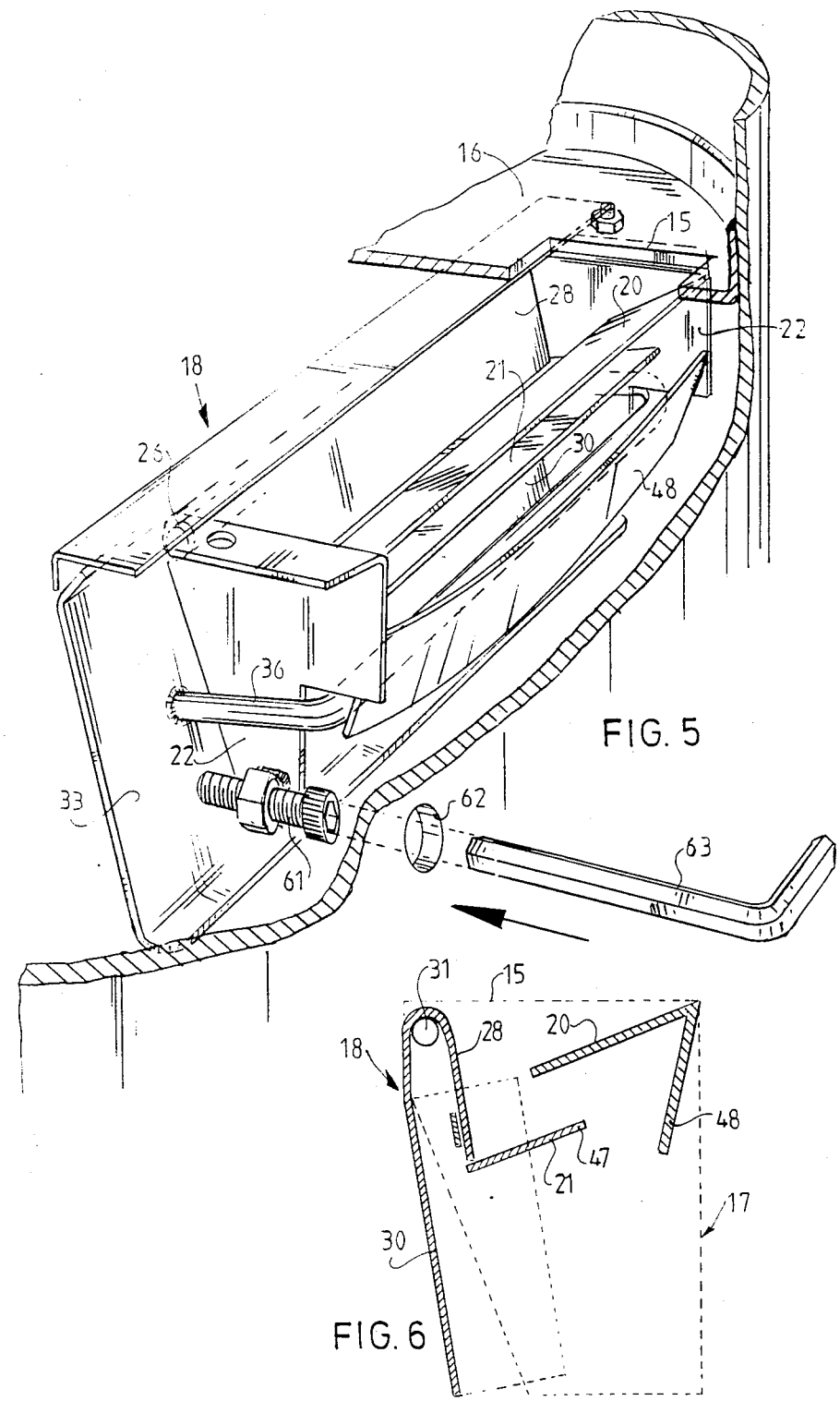

MASH-FEED TROUGH

The invention provides a mash-feed trough as stated in claim 1.

If the feature of claim 2 is applied, a solid trough will be obtained which is easy to clean and which will not be destroyed by the animals biting it. Known plastic troughs are destroyed by being bitten, starting at the corners. Metal troughs are expensive since they have to be manufactured from stainless steel. The trough according to the invention can be manufactured at a low cost price, is easily cleaned and yet is not destroyed by being bitten. This trough has no corners in which feed which has not been consumed can deposit and decay. The mash-feed trough according to the invention preferably contains closing and delivery means, this as indicated in one or more of the claims.

The invention will now be elucidated in the description following hereinafter with reference to a drawing. In the drawing:

FIG. 5 shows a perspective view of a fraction of another mash-feed trough according to the invention corresponding to FIG. 4; and FIG. 6 shows a vertical section through a fraction of yet another mash-feed trough according to the invention.

Figure 1:
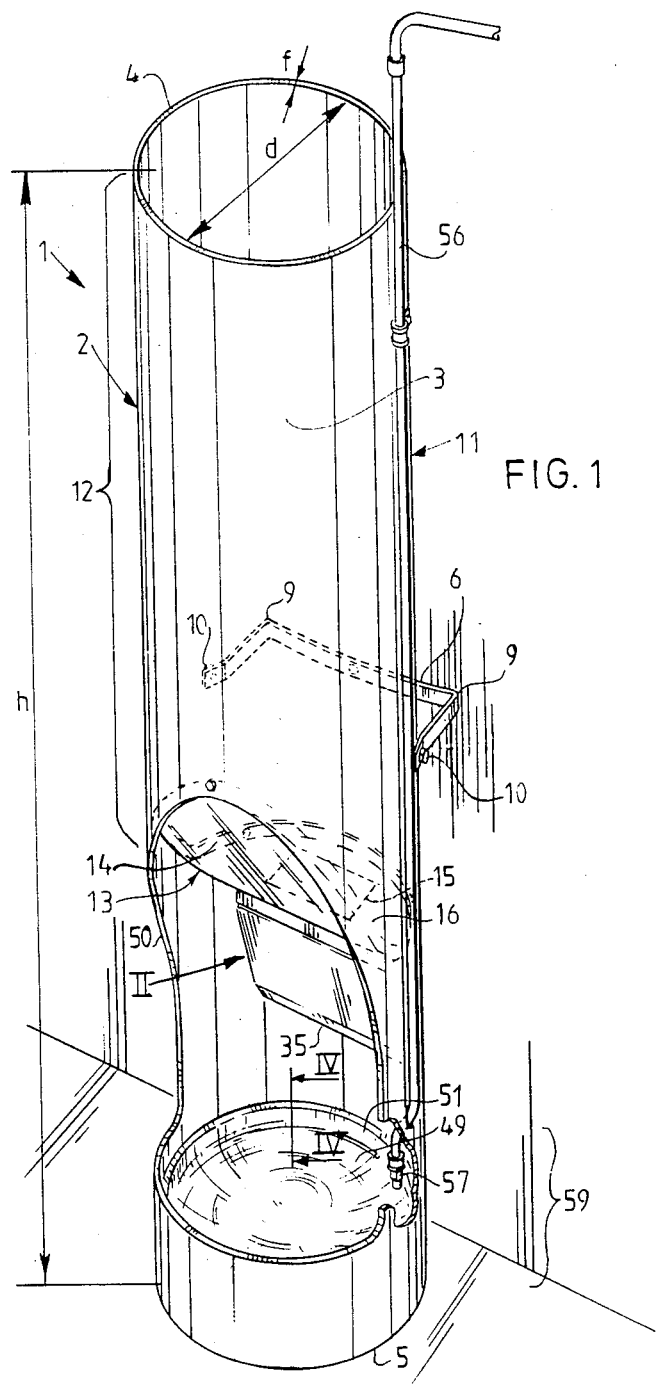
FIG. 1 shows a perspective, broken away view of a preferred embodiment of a mash-feed trough according to the invention.
Figure 2:
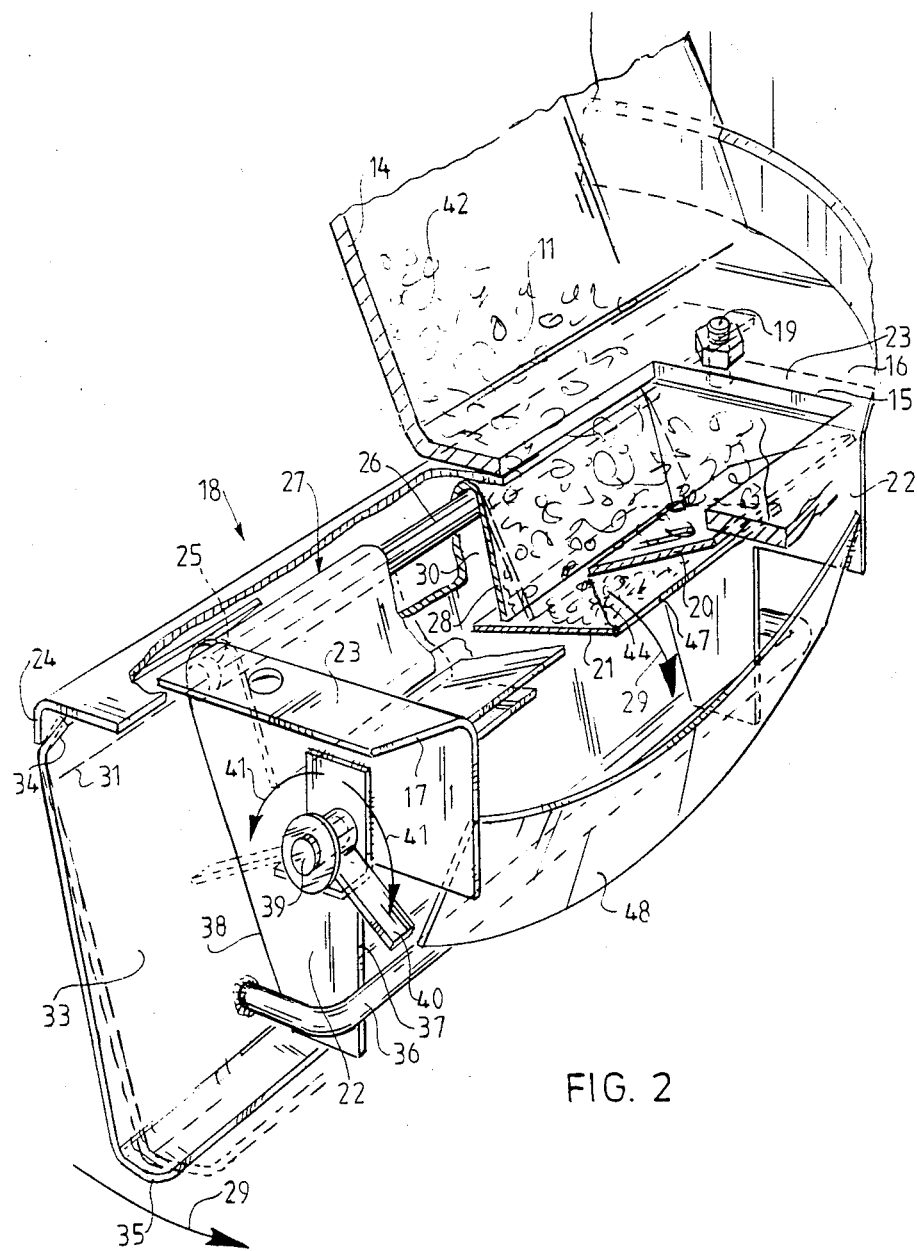
FIG. 2 shows on a larger scale a perspective, broken away view of detail II from FIG. 1.
Figure 3:
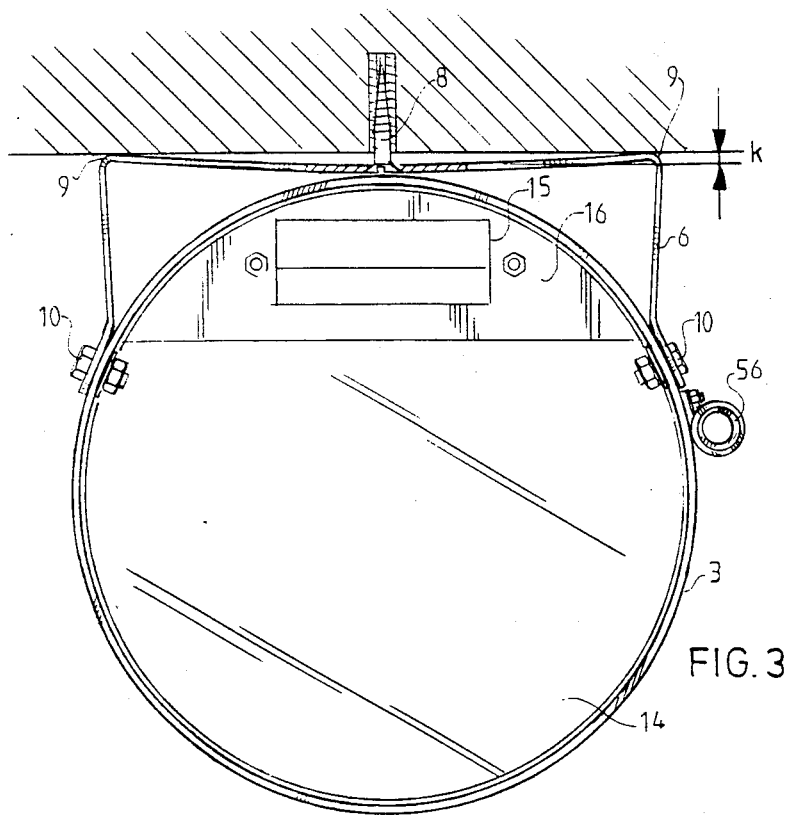
FIG. 3 shows on a larger scale a top view, partially in section, of the mash-feed trough from FIG. 1.
Figure 4:
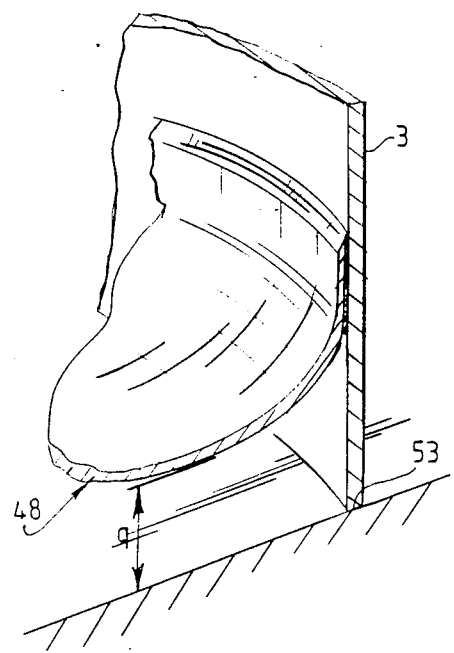
FIG. 4 shows on a larger scale a section along line IV—IV from FIG. 1.

Mash-feed trough 1 from FIGS. 1-4 comprises a casing 2 of which the external bounding consists of a corner-free plastic envelope 3. This is preferably a piece of round PVC piping like that for example available on the market as drain-pipe. The height h is such that the animals cannot reach upper edge 4 with their paws. For pigs this may be for example 125 cm or in this order of magnitude. The diameter d in the case of pigs is for example 315 mm and the wall thickness f for example 5 mm. The bottom edge 5 of envelope 3 rests on and closes off the floor. Attached on the rear of envelope 3 is a bracket 6 of stainless steel, curved inward through a dimension k, so that the feed trough can be secured firmly by means of one central screw 8 and two support points 9. Envelope 3 is attached to the previously fastened bracket 6 by means of nut and bolt connections 10 at the location of the storage reservoir 11 which is encased by the upper part 12 of envelope 3. Storage reservoir 11 is closed off on its underside by closing means 13 comprising a curved closing partition 14 of plastic, for example PVC, a sloping part of which links up with a horizontal bottom part 16. The closing partition 14 is fastened for connection inside envelope 3, for example with bolted and/or adhesive joints.

Attached by means of two bolted joints 19 against the underside of bottom plate 16 around the passage opening 15 is the frame 17 of a feed delivery device 18. Frame 17 consists of a downward inclining baffle plate 20, a slightly sloping closing plate 21, two vertical sidepieces 22 with fastening edges 23, a curved sloping guide plate 48 and a bent front edge 24. Inserted through round openings 25 of sidepieces 22 is a shaft 26 to which a curved plate 27 is welded. This plate 27 comprises a discharge member 28 in the form of a downward directed strip, the bottom edge thereof brushing over closing plate 21.

A control plate 30 to be swivelled in the direction of arrow 29 by the snout of an animal is connected to discharge plate 28 since both form part of one and the same plate 27 pivoting around horizontal axis 31. Control plate 30 protrudes with end-pieces 33 sideways outside discharge member 28 to connect up to envelope 3 with a tolerance of about an inch, so that the animals cannot reach the rear part of control plate 30. Also for this purpose the end-pieces 33 have short curved top edges 34, control plate 30 connects at its top to upper edge 24 with a close tolerance, and control plate 30 has a bottom edge 35 that is curved round to the rear. Control plate 30 has a bracket 36 welded to it on its rear, acting as a stop member together with rear edges 37 is sidepieces 22 to bound the return stroke counter to the direction of arrow 29. The outward stroke is bounded by control plate 30 closing against the front edges 38 of sidepieces 22. The stroke can also be reduced, for example for the feeding of young (small) animals, by a setting member 40 which can be adjusted on the outside of a sidepiece 22 around a shaft 39 secured to this sidepiece 22 between the inactive position drawn in FIG. 2 in full lines, and the stopping position drawn with dashed lines. This adjustment can be performed by adjusting setting member 40 as according to arrows 41 using a finger between and through end-piece 33 and envelope 3.

The dry feed 42, consisting for example of cattle feed pellets in the form of small round pieces, so-called "biks", falls from storage reservoir 11 through passage opening 15 and is then guided by baffle plate 20 as far as closing plate 21, where it remains lying as on an incline 44 until the moment that discharge plate 28 performs a movement in the direction of arrow 29 under the influence of the movement of the control plate 30 actuated by an animal. A dosed quantity that is determined by the stroke of discharge plate 28 then falls over edge 47 of closing plate 21 as far as guide plate 48, which is hollow curved and directed such that the falling feed 42 is guided from this point somewhat more toward the centre of a feed trough 49 so that it does not in any case fall against the outside part of envelope 3.

Arranged in envelope 3 beneath closing partition 14 is a considerable recess 50 such that an animal can easily put its head through it to eat from a trough 49 accommodated in the bottom piece 59 of envelope 3 and consisting of a corner-free, preferably round dish the peripheral edge of which is chamfered (see FIG. 4) and adapted to the corner-free envelope 3. Trough 49 is likewise manufactured from plastic, for example PVC, has a smooth hollow form and is fixed with adhesive into envelope 3 at a level difference q above the underside 53.

A liquid line 56 is attached to envelope 3 on the outside, enters into it above feed trough 49 and has there a liquid delivery member 57 in the form of a liquid valve to be opened by an animal counter to spring force. Since the usually cold liquid (water) line is placed outside the storage reservoir 11, condensate cannot make the dry feed in storage reservoir 11 wet.

Mash-feed trough 1 is a hygienic container, whereby feed 42 and liquid fall into the centre of the feed trough 49 and are there entirely consumed. The round form facilitates cleaning of the inside and outside, for example with a water jet, insofar as this may still be necessary.

The feed delivery means 18 from FIG. 5 correspond with those from FIGS. 1-4 with the understanding that the pivot stroke of control member 30 can now be set, instead of using a pivoting stop, by means of a screw 61 which can be adjusted with tool 63 through an opening 62 in the envelope, Screw 61 co-operates with a nut fastened to a sidepiece 22 and forms a stepless regulable stop up against which control plate 30 strikes. This fine adjustment is of interest for piglets, whereby the same wide control plate 30 can be applied in an envelope with a smaller diameter than that of FIGS. 1-4.

FIG. 6 shows a slightly different configuration of the dosing means 18.

We claim:

1. An animal feed device comprising a length of generally cylindrical PVC plastic pipe having upper and lower portions and having a recess formed at an intermediate portion of the pipe to provide an access opening into the interior of the device for the head of an animal, said upper portion of the pipe encompassing a storage reservoir for storing animal feed, said bottom portion of the pipe supporting a dish-shaped feed trough for receiving feed from said storage reservoir, closing means supported by said pipe for closing off the underside of said storage reservoir and including feed delivery means having a portion engageable by the head of an animal extending into said recess for actuating the feed delivery means, and liquid delivery means for delivering liquid to said feed trough.

2. A device as defined in claim 1 wherein said feed trough includes a generally circular outer edge portion fitting snugly within the inner wall of said pipe and defining a corner-free construction.

3. A device as defined in claim 1 wherein said pipe includes a bottom edge, said feed trough being supported by said pipe in a position spaced above said bottom edge.

4. A device as defined in claim 1 wherein said feed trough is also formed of plastic.

5. A device as defined in claim 1 wherein said closing means includes a partition having an opening formed therethrough, the feed delivery means including a closing plate supported beneath said opening and having a delivery edge over which feed is delivered to said feed trough, a discharge member supported for movement above said closing plate to discharge feed over said edge, and a control member connected to said discharge member and movably supported adjacent said recess for engagement by the head of an animal to cause movement of said discharge member to discharge feed over said edge.

6. A device as defined in claim 5 including a curved guide plate supported beneath said edge for engaging feed discharged over said discharge edge and guiding said feed onto said feed trough.

7. A device as defined in claim 5 wherein said control member is supported for swinging movement about a substantially horizontal axis, and including stop means for limiting movement of said control member in one direction.

8. A device as defined in claim 7 including a setting means for limiting movement of said control member in an opposite direction, said setting means being adjustable to at least two different positions for setting different amounts of feed delivered by said feed delivery means.

9. A device as defined in claim 1 wherein said portion of the feed delivery means engageable by the head of an animal comprises a control plate having top and bottom edge portions curved away from said recess, and a frame supported by said pipe, said frame having an edge disposed over and closely adjacent said top edge portion of the control plate.

10. A device as defined in claim 1 wherein said portion of the feed delivery means engageable by the head of an animal comprises a control plate having opposite lateral edge portions thereof which are spaced about one inch from the inner surface of the pipe.

11. A device as defined in claim 1 wherein said liquid delivery means comprises a liquid line disposed outside said pipe and having a terminal end supported within the pipe above the feed trough, said terminal end including liquid delivery means engageable by and operated by the head of an animal extending within the device.

* * * * *